United States Patent [19]

Bryg et al.

[11] Patent Number: 4,914,582
[45] Date of Patent: Apr. 3, 1990

[54] CACHE TAG LOOKASIDE

[75] Inventors: William R. Bryg, Saratoga; Russell Kao, Palo Alto, both of Calif.

[73] Assignee: Hewlett-Packard Company, Palo Alto, Calif.

[21] Appl. No.: 879,707

[22] Filed: Jun. 27, 1986

[51] Int. Cl.[4] .............................................. G06F 12/08
[52] U.S. Cl. .................................. 364/200; 364/243; 364/243.41; 364/243.44
[58] Field of Search ... 364/200 MS File, 900 MS File

[56] References Cited

U.S. PATENT DOCUMENTS

| | | | |
|---|---|---|---|
| 4,027,291 | 5/1977 | Tokura et al. | 364/200 |
| 4,149,239 | 4/1979 | Jenkins et al. | 364/200 |
| 4,314,331 | 2/1982 | Porter et al. | 364/200 |
| 4,462,072 | 7/1984 | Tague et al. | 364/200 |
| 4,479,180 | 10/1984 | Miller et al. | 364/200 |
| 4,520,441 | 5/1985 | Bandoh et al. | 364/200 |

Primary Examiner—Gary V. Harkcom
Assistant Examiner—Mark K. Zimmerman
Attorney, Agent, or Firm—Alan H. Haggard

[57] ABSTRACT

A method of retrieving data from a multi-set cache memory in a computer system. An address, which includes an index, is presented by the processor to the cache memory. The index is utilized to access the cache to generate an output which includes a block corresponding to the index from each set of the cache. Each block includes an address tag and data. A portion of the address tag for all but one of the blocks is compared with a corresponding portion of the address. If the comparison results in a match, then the data from the block associated with match is provided to the processor. If the comparison does not result in a match, then the data from the remaining block is provided to the processor. A full address tag comparison is done in parallel with the "lookaside tag" comparison to confirm a "hit."

7 Claims, 3 Drawing Sheets

CACHE TAG LOOKASIDE

FIELD OF THE INVENTION

The present invention relates to computer systems of the type including a ache memory and, more particularly, to a method for improving the access time of a cache memory.

BACKGROUND OF THE INVENTION

Most modern computer systems include a central processing unit (CPU) and a main memory. The speed at which the CPU can decode and execute instructions to process data has for some time exceeded the speed at which instructions and operands can be transferred from main memory to the CPU. In an attempt to reduce the problems caused by this mismatch, many computers include a cache memory or buffer between the CPU and main memory.

A cache memory is a small, high-speed buffer memory used to hold temporarily those portions of the contents of main memory which it is believed will be used in the near future by the CPU. The main purpose of a cache memory is to shorten the time necessary to perform memory accesses. The information located in cache memory may be accessed in much less time than that located in main memory. Thus, a CPU with a cache memory needs to spend far less time waiting for instructions and operands to be fetched and/or stored. For example, in typical large, high-speed computers, main memory can be accessed in 300 to 600 nanoseconds; information can be obtained from a cache memory on the other hand, in 50 to 100 nanoseconds. For such machines, the cache memory produces a very substantial increase in execution speed. However, the performance of the computer system is still limited in instruction execution rate by cache memory access time. Additional increases in instruction execution rate can be gained by further decreasing the cache memory access time.

The success of cache memories is based on the assumption that, because a particular memory location has been referenced, that location and locations very close to it are very likely to be accessed in the near future. This is often referred to as the property of locality. The property of locality has two aspects, temporal and spatial. While over short periods of time, a program distributes its memory references nonuniformly over its address space, the portions of the address space which are favored remain largely the same for long periods of time. This first property of locality, called temporal locality, or locality by time, means that the information which will be in use in the near future is likely to be in use already. This type of behavior can be expected from program loops in which both data and instructions are reused. The second property of locality, locality by space, means that portions of the address space which are in use generally consist of a fairly small number of individually contiguous segments of that address space. Locality by space, then, means that the loci of reference of the program in the near future are likely to be near the current loci of reference. This type of behavior can be expected from common knowledge of programs: related data items (variables, arrays) are usually stored together, and instructions are mostly executed sequentially. Since the cache memory buffers segments of information that have been recently used, the property of locality implies that needed information is also likely to be found in the cache. See, Smith, A. J., *Cache Memories*, ACM Computing Surveys, 14:3 (Sept. 1982), pp. 473-530.

A cache is made up of many blocks of one or more words of data, each of which has associated with it an address tag that uniquely identifies which block of main memory it is a copy of. Each time the processor makes a memory reference, the cache makes an address tag comparison to see if it has a copy of the requested data. If it does, it supplies the data; if it does not, it retrieves the block from main memory, replacing one of the blocks stored in the cache, and then supplies the retrieved data to the processor.

Optimizing the design of a cache memory generally has four aspects:

(1) Maximizing the probability of finding a memory reference's information in the cache (the so-called "hit" ratio),
(2) minimizing the time required to access information that is indeed in the cache (access time),
(3) minimizing the delay due to a cache "miss", and
(4) minimizing the overheads of updating main memory and maintaining multicache consistency.

All of these objectives must be accomplished under suitable cost constraints and in view of the interrelationship between the parameters; for example, the trade-off between hit ratio and access time. It is obvious that the larger the cache, the higher the probability of finding the needed information in it. Cache sizes cannot be expanded without limit, however, for several reasons: cost, the most important reason in many machines, especially small ones; physical size, the cache must fit on the boards and in the cabinets; and access time, the larger the cache, the slower it will become.

Information is generally retrieved from cache associatively to determine if there is a "hit". However, large, fully associative memories are both very expensive and somewhat slow. In early cache memories, all the elements were searched associatively for each request by the CPU. In order to provide the access time required to keep up with the CPU, cache size was limited and the hit ratio was thus rather low.

FIG. 1 is a schematic illustration of a conventional, direct-map single-set cache. As described above, the illustrated cache comprises a number of blocks, each with its own data and address tag. For any cache access, a portion of the address, called the index, is used to select one block (in an operation like a RAM access) which will be checked to see if it is the one requested. If it is not the requested block, then the cache will fetch the correct one from main memory, replacing the block it checked. Thus, for any block in main memory, there is exactly one block in the cache that may contain it. The cache illustrated in FIG. 1 has four words of data in each block. Because the location in the cache uniquely specifies the index portion of the address, the tag compare need only be done on the higher portion of the address.

Cache memories may also be organized into groups of smaller associative memories called sets, each containing a number of locations, referred to as the set size. For a cache of size m, divided into L sets, there are s=m/L locations in each set. When an address in main memory is mapped into the cache, it can appear in any of the L sets. For a cache of a given size, searching each of the sets in parallel can improve access time by a factor of L.

FIG. 2 is a schematic illustration of the simplest and most common associative multi-set cache, the two-set cache. In an n-set cache, each block of memory has "n" possible slots in which it might be stored in the cache; so a process could have "n" blocks with the same index in the cache simultaneously without "thrashing". The cache accesses each of the "n" blocks at the specified index simultaneously and checks to see if any is the requested block. If one is, the cache returns it; if it is not, it fetches the requested block from main memory replacing one of the blocks with the new one. In a cache with more than two sets, the extra sets are added in parallel, with the final level of OR-ing and multiplexing getting wider.

The design choice between the single-set, direct-map cache shown in FIG. 1 and an associative, multi-set cache of the type shown in FIG. 2 is based on a trade-off between access time and hit ratio. For the same size cache, the access time for a multi-set cache is longer than for a single-set cache because the associative address comparison and required multiplexing can take a long time. The multi-set cache is also more expensive. On the other hand, the hit ratio of the multi-set cache is better.

Obviously, it would be advantageous to improve the access time for a multi-set cache.

SUMMARY

It is an object of the present invention to reduce the time to access a multi-set cache memory.

This and other objects of the invention are accomplished by utilizing a standard address tag comparison to check for a cache hit, plus a comparison of a second, smaller set of "lookaside tags" which are used only for set selection. Since the "lookaside tags" are smaller, the comparison, and hence the set selection, can be performed faster than in prior art multi-set cache operations.

DETAILED DESCRIPTION OF THE INVENTION

Figure 1:
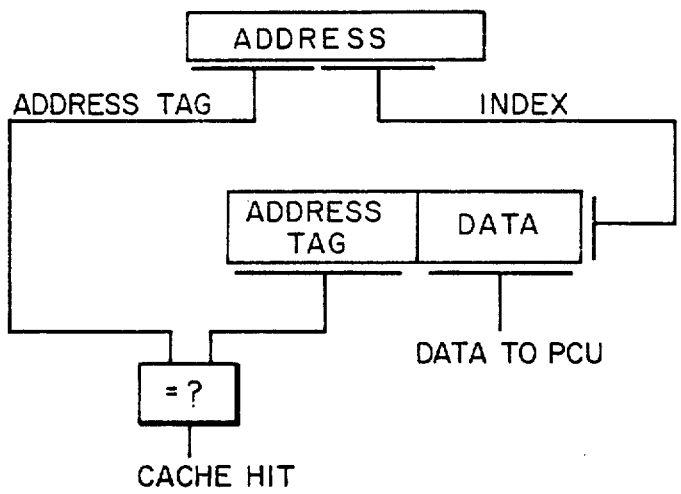
FIG. 1 is a schematic illustration of a conventional single-set cache.
Figure 2:
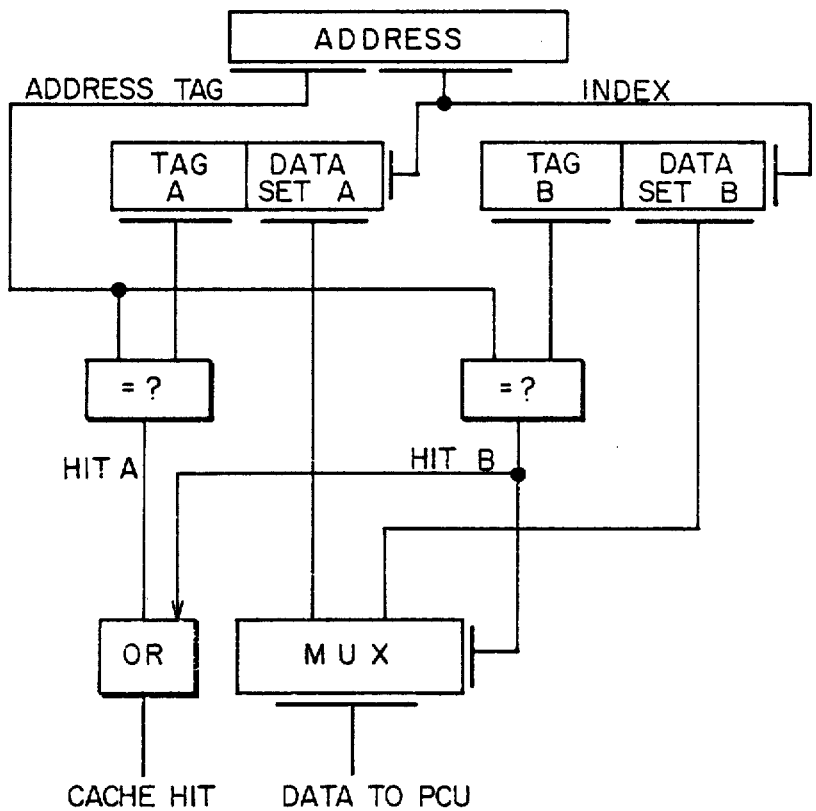
FIG. 2 is a schematic illustration of a conventional multiple-set cache.
Figure 3:
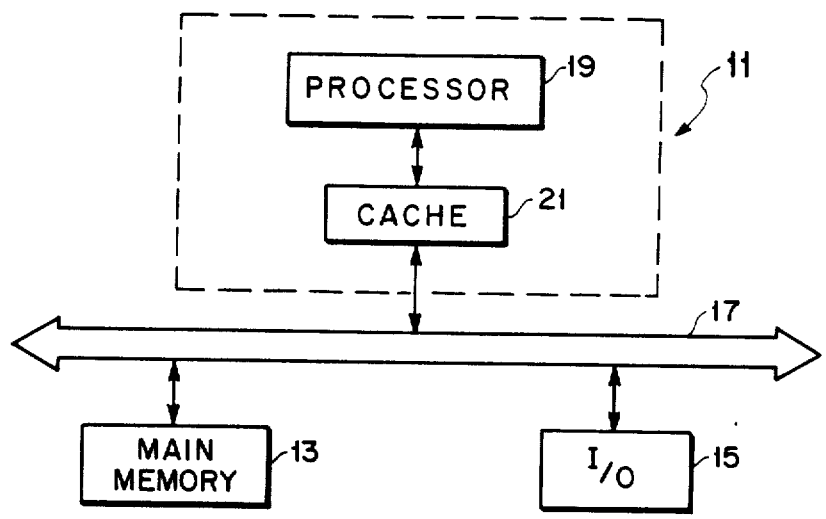
FIG. 3 is a schematic block diagram of a computer system having a cache memory.

A computer system which includes a cache memory is illustrated in FIG. 3. A CPU 11 communicates with main memory 13 and an input/output channel 15 via bus 17. The CPU includes a processor 19 which fetches, decodes and executes instructions to process data. Since it is not practical to store all the instructions and data used by the computer system in CPU 11, the data and instructions are stored in main memory 13, transferred to processor 19 when they are requested during the execution of a program or routine and returned to main memory after the program or routine has been completed.

Access to main memory 13 is relatively slow compared with the operation of processor 19. If processor 19 had to wait for main memory access to be completed each time an instruction or data was needed, its execution rate would be significantly reduced. In order to provide access times which more closely match the needs of the processor 19, a buffer memory, cache memory 21, stores a limited number of instructions and data. Since cache 21 is much smaller than main memory 13 it can be economically built to have higher access rates.

Nevertheless, there is still a trade-off between the access time for the cache memory 21 and the size of the cache. As discussed above, as the cache becomes larger and more complex, it becomes more expensive and its access time increases. Thus, if cache 21 is made very large to increase the hit ratio, although there are very few references to main memory 13, the processor 19 may be slowed down by increased access time even for a "hit." It is therefore desirable to decrease the cache memory access time as much as possible.

Figure 4:
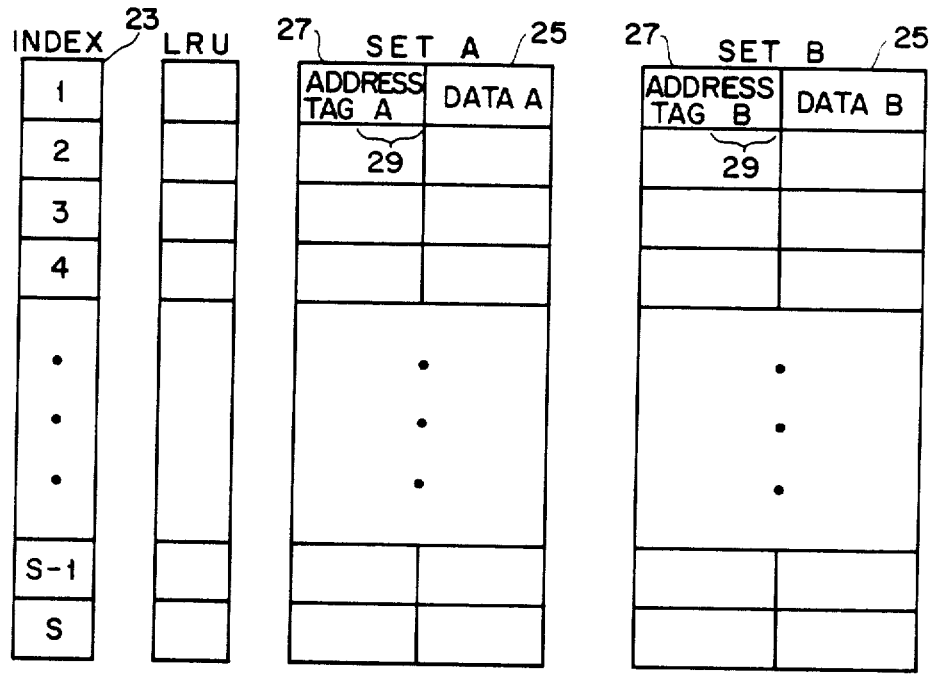
FIG. 4 is a schematic illustration of the structure of a cache memory in accordance with the present invention.

To explain the present invention more completely an understanding of the structure of cache 21 is necessary. FIG. 4 shows a cache memory having two sets A and B. Each set comprises an array of locations or blocks which are labeled with an index 23. Each block contains data 25 and an address tag 27. In addition to the normal address tag 27, a smaller, "lookaside tag" 29 derived from the standard address tag is also designated. The "lookaside tag" is an arbitrary number of bits long, but it is less than that necessary to check for a hit.

In the preferred embodiment, each data block contains four words. The four-word unit is the unit in which data is exchanged between cache memory 21 and main memory 13 and is also the unit in which data is indexed, fetched and replaced in the cache 21. A block could contain fewer or more words, (but always a power of 2. These parameters are a matter of design choice for the memory system.

Each time processor 19 makes a memory reference, cache 21 is searched to see if it has a copy of the requested data. If it does, the data is supplied to the processor 19. Otherwise, the data must be fetched in a block from main memory 13, supplied to the processor 19 and stored in cache memory 21, replacing one of the blocks already in the cache in accordance with a replacement scheme.

The most commonly used and preferred replacement scheme is Least Recently Used ("LRU"). According to the LRU replacement scheme, for each group of blocks at a particular index, the cache maintains several status bits that keep track of the order in which these blocks were last accessed. Each time one of the blocks is accessed, it is marked most recently used and the others are adjusted accordingly. When there is a miss, the block swapped out to make room for the block being retrieved from main memory is the block that was least recently used.

Figure 5:
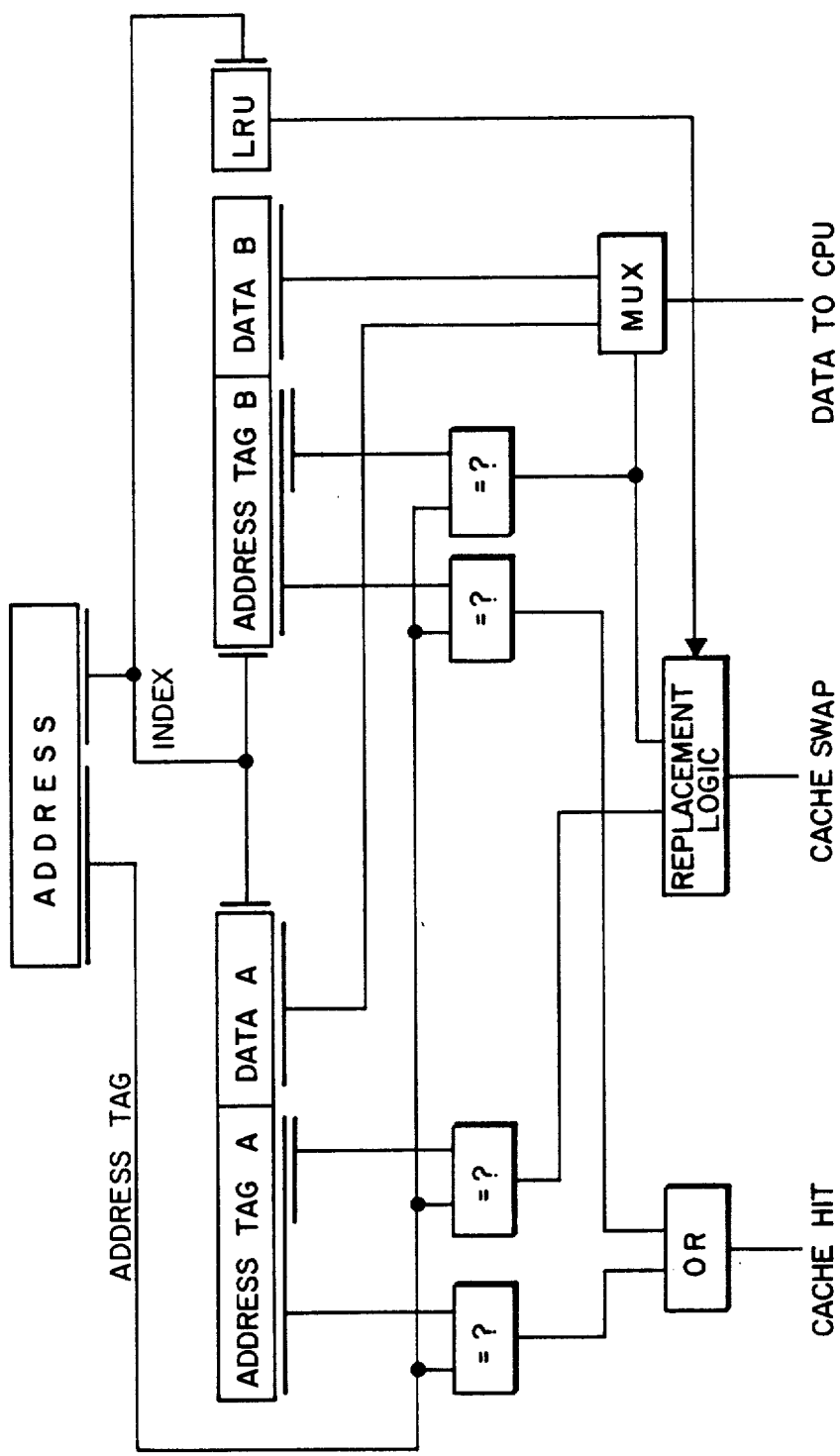
FIG. 5 is a schematic block diagram illustrating the operation of a cache memory according to the present invention.

FIG. 5 illustrates the cache search operation of the present invention utilizing the "lookaside tags". A search of the cache commences when processor 19 presents an address to be retrieved. The address comprises an address tag which identifies the location of the requested data in main memory and an index. The index is provided to the cache which responds by returning the blocks in each cache set A and B corresponding to the index. The "lookaside tag" for the returned block from one of sets A and B is then compared with the corresponding part of the address. If there is a match, then that set is selected for immediate return to the processor; otherwise, the remaining set is provided to the processor. The normal full tag comparison is utilized in parallel to confirm a "hit."

If the full tag comparison determines that there is, in fact, a "miss," then since the processor has retrieved but not yet executed the erroneous data provided by the "lookaside tag" comparison, the required data can be fetched from main memory and provided to the processor in a timely manner.

While the "lookaside tag" procedure has been described in conjunction with a two-set cache, it should be appreciated that the procedure is applicable to multi-set caches of any set size.

A problem an arise if there are two blocks in the cache that have the same "lookaside tag" but differ in the remainder of the address tag, since then a unique selection might not be made. To prevent this conflict, if a block is about to be loaded into the cache that would have the same "lookaside tag" as a block already present in the cache, then as shown in FIG. 5, replacement logic makes this determination and modifies the standard replacement scheme in this instance such that the block replaced is the block which has the same lookaside tag as the block to be loaded.

It should be understood that various alternatives to the cache memory described herein may be employed in practicing the present invention. It is intended that the claims define the invention, and that the methods within the scope of these claims and their equivalents be covered thereby.

What is claimed is:

1. A method of retrieving requested data from a multi-set cache memory in a computer system comprising a processor, a main memory and a multi-set cache memory, said multi-set cache memory having a plurality of cache memory sets and said method comprising the steps of:
   (a) presenting an address from the processor to the cache memory, said address including an index;
   (b) accessing the cache memory utilizing said index to generate an output from each cache memory set of the plurality of cache memory sets, the output from each cache memory set comprising a block corresponding to said index from each cache memory set from the plurality of cache memory sets, said block from each cache memory set including an address tag and associated data;
   (c) comparing a portion of a first address tag from a first block from a first cache memory set in the plurality of cache memory sets, with a corresponding portion of said address; and
   (d) in the event said comparison results in a match, providing the associated data associated with the address tag for which there is a match, to the processor.

2. A method as in claim 1 including the additional step of;
   (e) comparing said full address tag for which there is a match in step (d), with corresponding portion of said address to confirm said match.

3. A method as in claim 2 including the further steps of, in the event that the comparison in step (e) of said full address tag with a corresponding portion of said address results in a cache miss:
   (f) fetching the requested data from main memory and
   (g) providing the requested data to the processor.

4. A method of retrieving requested data from a multi-set cache memory in a computer system comprising a processor, a main memory and a multi-set cache memory, said multi-set cache memory having a plurality of cache memory sets and said method comprising:
   (a) presenting an address from the processor to the cache memory, said address including an index, wherein said address indicates the location of said requested data in said main memory;
   (b) accessing the cache memory utilizing said index to generate an output from each cache memory set of the plurality of cache memory sets, the output from each cache memory set comprising a block corresponding to said index from each cache memory set from the plurality of cache memory sets, said block from each cache memory set including an address tag and associated data;
   (c) comparing a portion of each address tag from each said block from each cache memory set in the plurality of cache memory sets, with a corresponding portion of said address; and
   (d) determining for each address tag from each said block from each cache memory set, except for a first address tag from a first cache memory set within the plurality of cache memory sets, whether the comparison in step (c) results in a match;
   (e) in the event said determination in step (d) does not produce a match, providing the associated data associated with the first address tag from the first cache memory set to the processor.

5. A method as in claim 4 including the further step of:
   (f) comparing said address tag for each of said blocks with said address and, in the event said address tag comparison does not result in a match, performing the following substeps:
      (f1) retrieving the requested data associated with said address from main memory;
      (f2) if said comparison in step c based on a portion of said address tag resulted in a match, loading said retrieved data into the cache memory at the location of the block which included the address tag for which there was a match; and
      (f3) if said comparison in step c based on a portion of said address tag did not result in a match, loading said requested data into the cache memory using a standard replacement scheme.

6. A method for replacing data in a multi-set cache memory of a computer system comprising a processor, a main memory and a multi-set cache memory, said multi-set cache memory having a plurality of cache memory sets and said method comprising:
   (a) presenting an address from the processor to the cache memory, said address including an index;
   (b) accessing the cache memory utilizing said index to generate an output from each cache memory set of the plurality of cache memory sets, the output from each cache memory set comprising a block corresponding to said index from each cache memory set from the plurality of cache memory sets, said block from each cache memory set including an address tag and associated data;
   (c) comparing a portion of a first address with a corresponding portion of said address tag for a first block from a first cache memory set in the plurality of cache memory sets;
   (d) considering the results of said comparisons in step c to determine if there has been a match; and (e) in the event said determination in step (d) determines there is a match, providing the associated data associated with the address tag for which there is a match to the processor.

7. A method as in claim 6 including the further step of:

(f) comparing said address tag for each of said blocks with said address and, in the event said address tag comparison does not result in a match, performing the following substeps:

(f1) retrieving the requested data associated with said address from main memory;

(f2) if said determination in step (d) determines there is a match, loading said retrieved data into the cache memory at the location of the block which included the address tag for which there was a match; and (f3) if said determination in step (d) determines there is no match, loading said retrieved data into the cache memory using a standard replacement scheme.

* * * * *